(12) United States Patent
Martinez

(10) Patent No.: US 9,569,424 B2
(45) Date of Patent: Feb. 14, 2017

(54) EMOTION DETECTION IN VOICEMAIL

(71) Applicant: Nuance Communications, Inc., Burlington, MA (US)

(72) Inventor: Raquel Sanchez Martinez, Cambridge (GB)

(73) Assignee: Nuance Communications, Inc., Burlington, MA (US)

(*) Notice: Subject to any disclaimer, the term of this patent is extended or adjusted under 35 U.S.C. 154(b) by 323 days.

(21) Appl. No.: 13/773,348

(22) Filed: Feb. 21, 2013

(65) Prior Publication Data
US 2014/0236596 A1 Aug. 21, 2014

(51) Int. Cl.
G10L 15/26 (2006.01)
G06F 17/27 (2006.01)
H04M 3/533 (2006.01)

(52) U.S. Cl.
CPC ........ G06F 17/2785 (2013.01); H04M 3/5335 (2013.01); H04M 2201/60 (2013.01)

(58) Field of Classification Search
CPC ......... G06L 15/26; G06F 17/27; H04M 3/533; H04M 3/5335; H04M 2201/60
USPC ........................................................ 704/235
See application file for complete search history.

(56) References Cited

U.S. PATENT DOCUMENTS

| | | | | |
|---|---|---|---|---|
| 8,170,872 B2* | 5/2012 | Lyle | ..................... | G06Q 10/107 379/88.17 |
| 9,015,046 B2* | 4/2015 | Pereg | ................... | G06Q 10/063 379/265.01 |
| 2002/0194002 A1* | 12/2002 | Petrushin | ................ | G10L 17/26 704/270 |
| 2003/0177008 A1* | 9/2003 | Chang | ..................... | G10L 17/26 704/255 |
| 2005/0108775 A1* | 5/2005 | Bachar | ................... | G06Q 50/22 725/135 |
| 2005/0159939 A1* | 7/2005 | Mohler | ................... | G06F 17/27 704/4 |
| 2005/0244798 A1* | 11/2005 | Zernzach | ............... | G09B 23/28 434/236 |
| 2006/0234680 A1* | 10/2006 | Doulton | ............. | H04L 12/5835 455/412.1 |

(Continued)

FOREIGN PATENT DOCUMENTS

WO   WO 2012/081889   *   6/2012

OTHER PUBLICATIONS

Chuang, Ze-Jing, and Chung-Hsien Wu. "Multi-modal emotion recognition from speech and text." Computational Linguistics and Chinese Language Processing 9.2 (2004): 45-62.*

(Continued)

*Primary Examiner* — Tammy Paige Goddard
*Assistant Examiner* — Edwin S Leland, III
(74) *Attorney, Agent, or Firm* — Wolf, Greenfield & Sacks, P.C.

(57) ABSTRACT

Methods and apparatus for processing a voicemail message to generate a textual representation of at least a portion of the voicemail message. At least one emotion expressed in the voicemail message is determined by applying at least one emotion classifier to the voicemail message and/or the textual representation. An indication of the determined at least one emotion is provided in a manner associated with the textual representation of the at least a portion of the voicemail message.

19 Claims, 6 Drawing Sheets

(56) References Cited

U.S. PATENT DOCUMENTS

| | | | |
|---|---|---|---|
| 2007/0037590 A1* | 2/2007 | Lee | G06F 17/211 455/466 |
| 2007/0054678 A1* | 3/2007 | Doulton | H04M 3/42382 455/466 |
| 2008/0027984 A1* | 1/2008 | Perdomo | G06Q 10/107 |
| 2008/0056470 A1* | 3/2008 | Chiu | H04L 12/583 379/93.17 |
| 2008/0059158 A1* | 3/2008 | Matsuo | H04M 1/21 704/221 |
| 2010/0085416 A1* | 4/2010 | Hegde | H04N 7/157 348/14.08 |
| 2010/0158213 A1* | 6/2010 | Mikan | H04M 3/42221 379/88.14 |
| 2010/0246799 A1* | 9/2010 | Lubowich | G10L 15/142 379/265.09 |
| 2011/0010173 A1* | 1/2011 | Scott | H04M 3/42221 704/235 |
| 2011/0087483 A1* | 4/2011 | Hsieh | G06F 17/27 704/9 |
| 2011/0200181 A1* | 8/2011 | Issa | G06Q 10/10 379/93.01 |
| 2011/0208522 A1* | 8/2011 | Pereg | G06F 17/279 704/235 |
| 2011/0295607 A1* | 12/2011 | Krishnan | G10L 17/26 704/270 |
| 2012/0179751 A1* | 7/2012 | Ahn | G06Q 50/01 709/204 |
| 2013/0060875 A1* | 3/2013 | Burnett | H04N 21/4788 709/206 |
| 2013/0268611 A1* | 10/2013 | Pattan | H04L 51/10 709/206 |
| 2013/0297297 A1* | 11/2013 | Guven | G10L 15/02 704/204 |
| 2014/0052441 A1* | 2/2014 | Fujibayashi | G06F 17/241 704/231 |
| 2014/0112556 A1* | 4/2014 | Kalinli-Akbacak | G10L 25/63 382/128 |
| 2014/0192229 A1* | 7/2014 | Kim | G06K 9/00302 348/231.3 |
| 2014/0212007 A1* | 7/2014 | Oh | G06F 17/214 382/119 |
| 2014/0229175 A1* | 8/2014 | Fischer | G10L 15/22 704/235 |

OTHER PUBLICATIONS

Inanoglu et al., "Emotive Alert: HMM-Based Emotion Detection in Voicemail Messages," MIT Media Lab Technical Report No. 585, Jan. 2005. Appeared in: Intelligent user Interfaces (IUI 05), 2005, San Diego, California, USA.

* cited by examiner

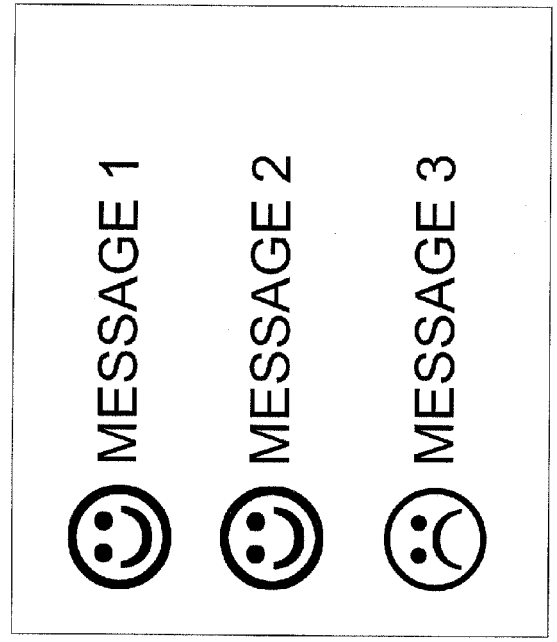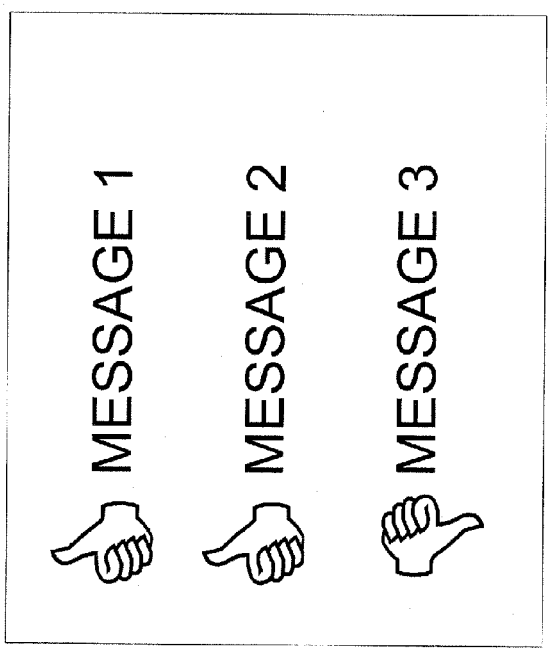
FIG. 3

EMOTION DETECTION IN VOICEMAIL

BACKGROUND

Voicemail transcription services process audio included in a voicemail message and generate a textual representation of at least a portion of the audio. Following transcription, the textual representation may be sent to a computing device (e.g., a smartphone or tablet computer) for viewing by a user. For example, the textual representation may be sent to a mobile device using a web-based email service as an email message including the textual representation, using a SMS text-messaging system as an SMS text message, or using another text-based service available on the mobile device.

SUMMARY

One embodiment is directed to a method for use with a voicemail transcription system that processes a voicemail message and generates a textual representation of at least a portion of the voicemail message, the method comprising: determining at least one emotion expressed in the voicemail message, wherein the determining comprises applying at least one emotion classifier to the voicemail message; and providing an indication of the determined at least one emotion in a manner associated with the textual representation of the at least a portion of the voicemail message.

Another embodiment is directed to a computer-readable storage medium encoded with a plurality of instructions that, when executed by at least one processor, perform a method for use with a voicemail transcription system that processes a voicemail message and generates a textual representation of at least a portion of the voicemail message, the method comprising: determining at least one emotion expressed in the voicemail message, wherein the determining comprises applying at least one emotion classifier to the voicemail message; and providing an indication of the determined at least one emotion in a manner associated with the textual representation of the at least a portion of the voicemail message.

Another embodiment is directed to a computer system for use with a voicemail transcription system that processes a voicemail message and generates a textual representation of at least a portion of the voicemail message. The computer system comprises at least one storage device configured to store at least one emotion classifier for determining at least one emotion expressed in the voicemail message; and at least one processor programmed to: determine the at least one emotion, wherein the determining comprises applying the at least one emotion classifier to the voicemail message; and provide an indication of the determined at least one emotion in a manner associated with the textual representation of the at least a portion of the voicemail message.

It should be appreciated that all combinations of the foregoing concepts and additional concepts discussed in greater detail below (provided that such concepts are not mutually inconsistent) are contemplated as being part of the inventive subject matter disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3A and 3B are illustrative portions of a user interface providing a visual indication of emotion information determined for voicemail messages in accordance with some embodiments of the invention;

DETAILED DESCRIPTION

The inventors have recognized and appreciated that the audio expressed in voicemail messages often includes emotion information that is lost during the voicemail transcription process when the audio is converted, at least in part, to a textual representation. Detection and subsequent presentation of emotion information expressed in a voicemail message may facilitate a richer user experience for users that receive textual representations generated by a voicemail message transcription service. For example, a voicemail message associated with a happy, pleasant, or content emotion may be categorized and presented to a user in a different manner than a voicemail message associated with an unhappy or displeased emotion, and both may be presented differently from a voicemail message associated with neutral emotion. By categorizing voicemail messages based, at least in part, on one or more emotions, a user is provided with additional information that may enhance the user experience. For example, such information may help the user decide whether, and in what order, to review and respond to received messages, or the information may be used by the user in any other desired way. To this end, some embodiments are directed to methods and apparatus that determine one or more emotions expressed in a voicemail message and provide an indication of the determined emotion information in a manner that is associated with a textual representation of at least a portion of voicemail message.

Figure 1:
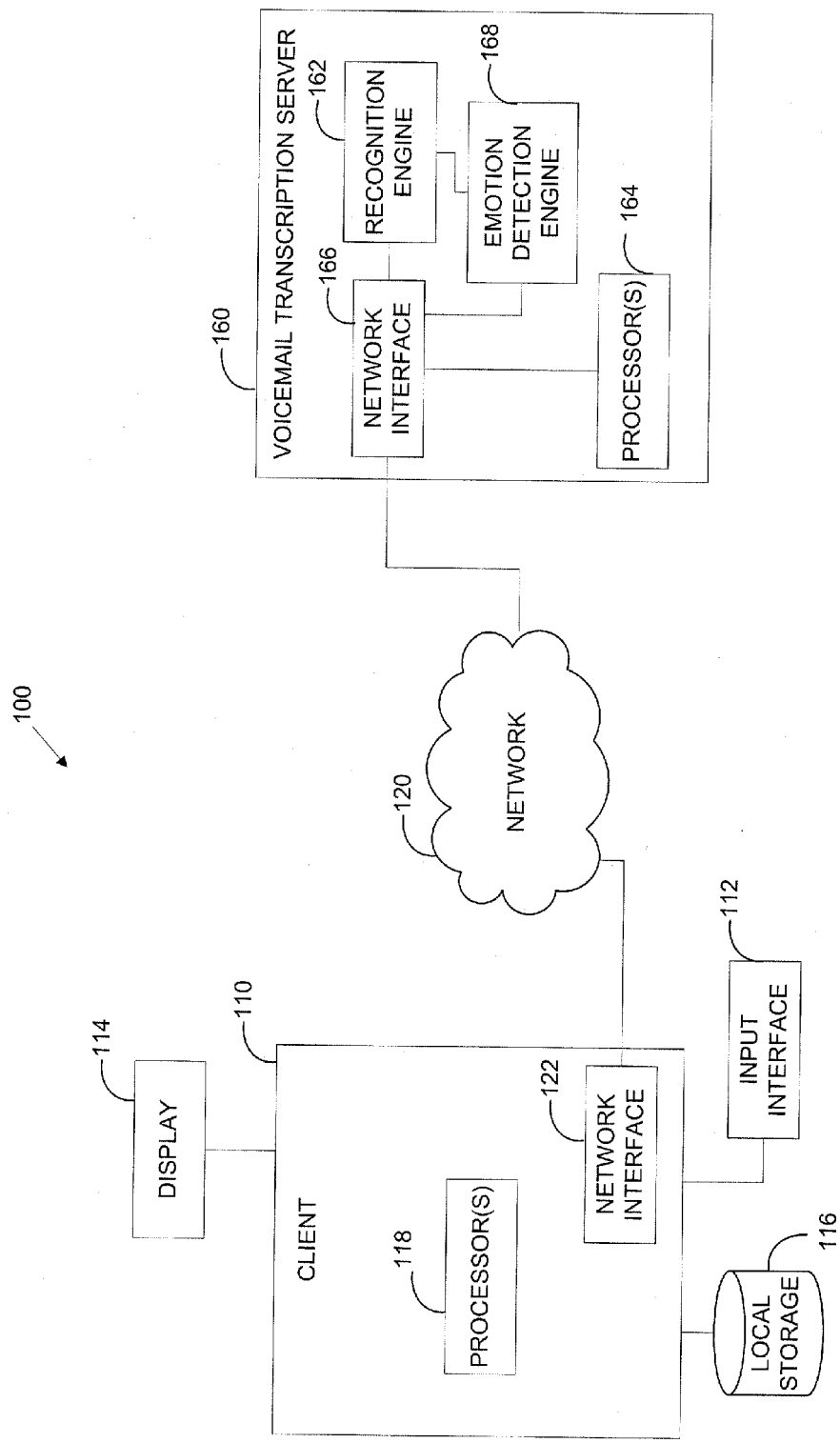
FIG. 1 is an illustrative voicemail message transcription system which may be used in accordance with some embodiments of the invention.

FIG. 1 shows an illustrative voice transcription system that may be used in accordance with some embodiments of the invention. System 100 includes client device 110 and voicemail transcription server 160 connected to client device 110 via network 120. Client device 110 includes input interface 112 configured to receive user input. The input interface may take any form as the aspects of the invention are not limited in this respect. In some embodiments, input interface 112 may include multiple input interfaces each configured to receive one or more types of user input. For example, input interface 112 may include a keyboard (e.g., a QWERTY keyboard), a keypad, a touch-sensitive screen, or any other suitable user input device. As another example, input interface may include a microphone that, when activated, receives speech input and performs automatic speech recognition (ASR) either locally on the client device, remotely (e.g., on a server), or both. The received speech input may be stored in local storage 116 associated with client device 110 to facilitate the ASR processing. Although local storage 116 is illustrated as being external to client device 110, it should be appreciated that local storage 116 may alternatively or additionally be provided internal to client device 110.

Client device 110 also includes one or more output devices including display 114 and at least one speaker (not shown) configured to produce audio output. Applications executing on client device 110 may be programmed to display a user interface to facilitate the performance of one or more actions associated with the application. In one example described herein, the application receives a textual representation of at least a portion of a voicemail message from a voicemail transcription service and displays the textual representation on display 114.

Client device 110 also includes one or more processors 118 programmed to execute a plurality of instructions to perform one or more functions on client device 110. Exemplary functions include, but are not limited to, facilitating the storage of user input, launching one or more applications on client device 110, and displaying information on display 114.

Client device 110 also includes network interface 122 configured to enable client device 110 to communicate with one or more computers (including voicemail transcription server 160) via network 120. For example, network interface 122 may be configured to receive a textual representation of at least a portion of a voicemail message from voicemail transcription server 160, as discussed in further detail below. Network 120 may be implemented in any suitable way using any suitable communication channel(s) enabling communication between the client device and the one or more computers. For example, network 120 may include, but is not limited to, a local area network, an Intranet, the Internet, or any suitable combination of local and wide area networks. Additionally, network interface 122 may be configured to support any of the one or more types of networks that enable communication with the one or more computers.

In some embodiments, voicemail transcription server 160 is configured to process audio associated with voicemail messages to produce a textual representation of at least a portion of the voicemail messages using recognition engine 162. Voicemail messages for use with some embodiments may be received and/or stored by any suitable electronic device or computer. Non-limiting examples of voicemail messages that may be processed in accordance with the techniques described herein include voicemail messages received by a mobile device, voicemail messages stored by an email server, voicemail messages stored by a voicemail system, or voicemail messages received and/or stored by any other suitable type of device.

Voicemail transcription server 160 includes one or more processors 164 that control the operation of the server to perform one or more tasks including, but not limited to, speech recognition and, in some embodiments, emotion detection. In some embodiments, the processes of speech recognition and emotion detection may be performed by the same computer (e.g., voicemail transcription server 160). However the aspects of the invention are not limited in this respect, as these processes may be performed by different computers. In this respect, the emotion detection can be provided as part of a same service or system as the transcription, or it may be provided separately therefrom by a same software vendor or service provider that provides the voicemail transcription or by a different software vendor or service provider.

Recognition engine 162 is configured to process audio including speech associated with a voicemail message using any suitable speech recognition techniques to determine a textual representation of at least a portion of the voicemail message. Recognition engine 162 may implement any type of automatic speech recognition to process voicemail messages, as the techniques described herein are not limited by the particular automatic speech recognition process used. As a non-limiting example, speech recognition engine 162 may employ acoustic and language models to map speech data to a textual representation. These models may be speaker independent, or one or both of the models may be associated with a particular speaker.

In the embodiment shown in FIG. 1, voicemail transcription server 160 also includes emotion detection engine 168 configured to determine one or more emotions expressed in voicemail messages transcribed by voicemail transcription server 160. In other embodiments, emotion detection engine 168 may be implemented by one or more computers separate from voicemail transcription server 160 and the aspects of the invention are not limited in this respect. In some embodiments, emotion detection engine 168 may receive as input, audio comprising speech associated with a voicemail message and/or a textual representation of at least a portion of the voicemail message output from recognition engine 162. Emotion detection engine 168 may use one or both of these inputs to determine one or more emotions expressed in the voicemail message, as discussed in further detail below.

Voicemail transcription server 160 may also include network interface 166 configured to transmit the textual representation output from recognition engine 162 and/or the emotion information output from emotion detection engine 168 to client device 110. The network interface may be any suitable interface capable of working with any suitable type of network 120, as the techniques described herein are not limited to use with any particular type of network 120 or network interface 166. In response to receiving the textual representation and the emotion information associated with a voicemail message, client device 110 may provide an indication of this information to a user in any of numerous ways, as discussed in more detail below.

Figure 2:
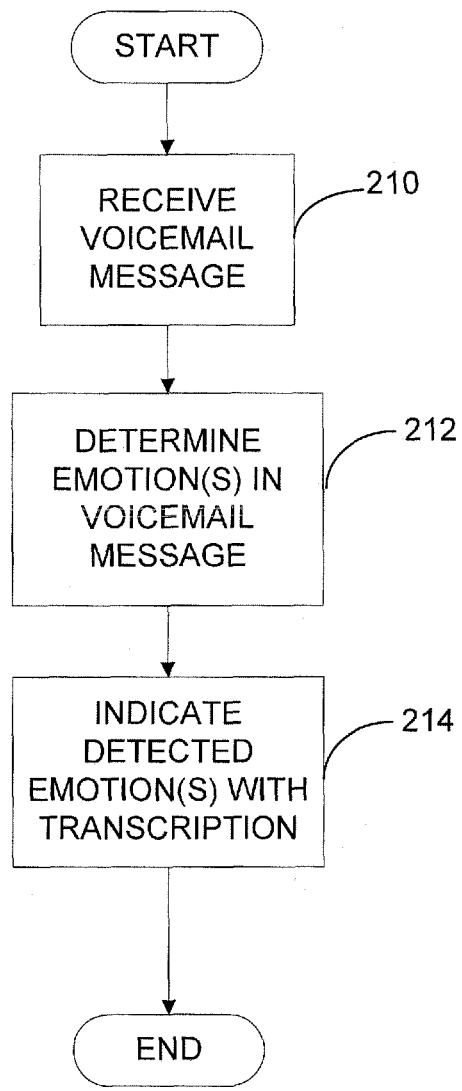
FIG. 2 is a flow chart of an illustrative process for providing an indication of emotion(s) expressed in a voicemail message to a user in accordance with some embodiments of the invention.

FIG. 2 shows an illustrative process for processing a voicemail message to determine emotion(s) expressed in the voicemail message in accordance with the techniques described herein. In act 210, information associated with a voicemail message is received by an emotion detection engine configured to determine at least one emotion expressed in the voicemail message. The information associated with the voicemail message may include audio comprising speech (e.g., all or part of the voicemail message itself) and/or a transcription of all or a part of the voicemail message. In determining the emotion(s) expressed in the voicemail message, the emotion detection engine may configured to process the audio only, the transcription only, or both the audio and the transcription, as discussed in more detail below.

As discussed above, the emotion detection engine may be implemented in any suitable way using any suitable number of processors. For example, in some embodiments, the emotion detection engine may be implemented as a portion of a voicemail transcription system that processes a voicemail message and generates a transcription (i.e., a textual representation) of at least a portion of the voicemail message. In other embodiments, the emotion detection engine may be implemented on one or more computers separate from, but in communication with, a voicemail transcription system.

After receiving information associated with the voicemail message, the process proceeds to act 212, where the received information is processed by the emotion detection engine to determine one or more emotions expressed in the voicemail message. The emotion(s) expressed in the voicemail message may be determined in any suitable way using any suitable techniques, as some embodiments described herein are not limited by the manner in which the emotion(s) expressed in the voicemail message are determined. In some embodiments, the received voicemail message is processed by applying at least one emotion classifier to the voicemail message to determine the one or more emotions. Illustrative emotion classifiers that may be applied to the voicemail message include, but are not limited to, support vector machines (SVMs), logistic regression classifiers, naïve Bayesian classifiers, Gaussian mixture models (GMMs), and statistical language models (e.g., n-gram models). Emotion classifiers may be based on an analysis of any suitable type of acoustic and/or linguistic information represented in input received by the emotion detection engine. For example, emotion classifiers may be based on features including, but not limited to, acoustic parameters (e.g., pitch, energy, and prosody), and linguistic parameters such as the words included in the message.

In some embodiments, a combination of emotion classifiers may be used, and the combination of emotion classifiers may be selected using any suitable criteria. For example, a selection of a combination of emotion classifiers may be selected for one or more users based, at least in part, on which classifiers have provided accurate classifications for previously classified voicemail messages. It should be appreciated that any suitable number of classifiers may be used (including one classifier), as the techniques described herein are not limited in this respect.

In some embodiments, one or more emotion classifiers used by the emotion detection engine to determine emotion(s) expressed in a voicemail message may be trained based on a corpus of emotion-tagged data to facilitate the determination of emotion(s) expressed in voicemail messages. In one implementation, a corpus of voicemail messages tagged with emotion classifications (e.g., happy/neutral or unhappy/angry) may be used to train an emotion classifier used by the emotion detection engine prior to using the emotion detection engine to determine emotion(s) expressed in voicemail messages in accordance with the techniques described herein. The emotion classifier may be trained using a corpus have any suitable size and/or content, as the techniques described herein are not limited to the use of an emotion classifier that was trained in any particular manner or using any particular type of training corpus.

In embodiments where the emotion detection engine is configured to receive audio as input, the emotion detection engine may analyze the audio to determine acoustic features (e.g., pitch and energy) that can be mapped to different emotions. In other embodiments where the emotion detection engine is configured to receive a transcription corresponding to at least a portion of the voicemail message, the emotion detection engine may analyze the transcription to identify words and/or n-grams associated with particular emotions. In yet further embodiments where the emotion detection engine is configured to receive both audio and a transcription as input, the emotion detection engine may analyze both types of inputs in any suitable way to determine the one or more emotions expressed in the voicemail message. For example, in one implementation, the audio input may be analyzed to determine acoustic features and the transcription may be analyzed to identify words associated with particular emotions. The emotion(s) expressed in the voicemail message may be determined based, at least in part, on a combination of the information extracted from the different inputs. Alternatively, even in embodiments where the emotion detection engine is configured to receive both audio and transcription input, a determination of the emotion information may be based on an analysis of the received audio only, or based on an analysis of the transcription information only, as the techniques described herein are not limited to use of audio messages or textual transcriptions to determine the emotion(s) expressed in the voicemail message.

After the emotion(s) expressed in the voicemail message have been determined, the process of FIG. 2 proceeds to act 214, where an indication of the determined emotion(s) is provided in a manner associated with the textual representation of the voicemail message provided by the voicemail transcription system. The indication of the determined emotion(s) may be provided in any suitable way including, but not limited to, using an audio indication, a tactile indication, or a visual indication. In some embodiments, a combination of different types of indications may be used, as the techniques described herein are not limited in this respect.

For the sake of simplicity, voicemail messages characterized as either expressing a happy emotion and/or an unhappy emotion will be used in the following examples for providing an indication of the determined emotion(s). However, it should be appreciated that any number or type of additional emotions and/or emotions other than happy and unhappy may alternatively be used in accordance with the techniques described herein.

In embodiments that provide the indication of emotion information expressed in a voicemail message using audio output, any suitable type of audio output may be used. For example, when a text-based message is received by a mobile device (e.g., a smartphone), the mobile device may be programmed to output an audio signal to alert the user that the text-based message has been received and is ready for viewing. An example of such an audio output is a ringtone stored by the mobile device and output in response to receiving a text-based message.

In some embodiments, the particular ringtone used to indicate receipt of a textual representation of a voicemail message from a voicemail transcription service may be determined based, at least in part, on one or more emotions determined to be expressed in the voicemail message. For example, a first ringtone may be selected in response to determining that a voicemail message is associated with a happy emotion, and a second ringtone may be selected in response to determining that a voicemail message is associated with an unhappy emotion. In some embodiments, a client device that receives voicemail message transcriptions from a voicemail transcription service may be configured to store preference information establishing preferences for how emotion information is to be conveyed to the user. A user of the client device may interact with a user interface provided by an application on the client device to specify the preference information. In response to receiving a voicemail message transcription and associated emotion information, the client device may access the emotion output preference information to determine an appropriate output (e.g., an appropriate ringtone) based, at least in part, on the preference information.

Although a ringtone is one example of audio output that may be used to provide an indication of a determined emotion expressed in a voicemail message, it should be appreciated that other types of audio output may alternatively be used. For example, in some embodiments, a client device may be programmed to implement a plurality of digital agent personas for interacting with a user of the client device. The digital agent personas may be characterized by different voice profiles, different styles of interaction, or any other suitable differences in audio output. For example, a first digital agent persona may be associated with a female voice profile and a second digital agent persona may be associated with a male voice profile. Different voice personas may also be provided in other ways, such as by using an accent for one or more the agents, using different styles of speech, using different voice talents' voices to represent different personas, etc. In some embodiments, an indication of emotion information expressed in a voicemail message and determined in accordance with the techniques described herein may be provided by selecting a particular digital agent persona to interact with the user based, at least in part, on the determined emotion(s). The selected digital agent persona may be used to interact with the user by providing audio output representative of the determined emotion(s). For example, when it is determined that a voicemail message is associated with a first emotion (e.g., a happy emotion), a first digital agent persona may be selected, whereas when it is determined that a voicemail message is associated with a second emotion (e.g., an unhappy emotion), a second digital persona may be selected. It should be appreciated that any suitable types of digital agent personas may be used in accordance with the techniques described herein.

Some client devices configured to receive transcriptions of voicemail messages may provide an indication of a determined emotion(s) expressed in a voicemail message by using tactile output, such as by using different vibration patterns. For example, in some embodiments, voicemail messages associated with a first type of emotion (e.g., happy) may be associated with a vibration pattern characterized by sustained vibration, whereas voicemail messages associated with a second type of emotion (e.g., unhappy) may be associated with a vibration pattern characterized by a pulsed vibration sequence. It should be appreciated that any types of vibration sequences may be used, as the example of using sustained or pulsed vibration is provided merely for exemplary purposes.

In some embodiments, an electronic device configured to receive a transcription of a voicemail message may display the transcribed voicemail message on a user interface provided by an application executing on the electronic device. For example, text-based SMS messages may be displayed on a user interface provided by a text messaging client application executing on the electronic device. This is merely one example, as the transcribed voice message may be displayed on a client device using any other suitable application executing on the client device, other non-limiting examples of which include, an email client so that the transcribed message is received as an email, a browser, and a custom application designed specifically to support voicemail transcription.

In some embodiments, the textual representation corresponding to the transcription of at least a portion of the voicemail message may be modified, at least in part, to provide an indication of the one or more emotions determined to be expressed in the voicemail message. In other embodiments, the indication of the emotion(s) may be provided as additional information so that the textual representation of the voicemail message is not modified.

In some embodiments, an indication of a determined emotion may be provided using visual output by associating a visual indication for the emotion(s) with the textual representation of the voicemail message and displaying the visual indication of the emotion(s) on a display of the electronic device that receives the voicemail transcription. The visual indication may be provided in any suitable way, as the techniques described below for providing a visual indication of emotion(s) associated with a voicemail message are merely examples.

An illustrative technique for providing a visual indication of an emotion expressed in a voicemail message comprises associating a graphical symbol with the voicemail message based, at least in part, on the determined emotion, and displaying the graphical symbol and an identifier of the voicemail message on a user interface provided by the client device. The identifier may identify the voicemail message in any suitable way (e.g., by identifying the telephone number of the caller who left the message, by displaying all or part of the transcription of the message, or in any other suitable way.)

An example of associating and displaying graphical symbols with identifiers of voicemail messages is illustrated in FIGS. 3A and 3B. In FIG. 3A, the first and second messages are determined to be associated with a happy emotion, while the third message is determined to be associated with an unhappy emotion. A "thumbs up" icon is associated with the first and second messages to identify the happy emotion expressed in these messages, and a "thumbs down" icon is associated with the third message to identify the unhappy emotion expressed in this message. In FIG. 3B, the first and second messages are associated with a "happy face" icon to denote that the emotion expressed in these messages is "happy," and an "unhappy face" icon is associated with the third message to denote that the emotion expressed in this message is "unhappy." Displaying a graphical symbol as a portion of, or in association with, the textual representation or any other identifier of the message, informs the user about the emotion expressed in the voicemail message. The user may use this information in any desired way, e.g., to perform an action, such as prioritizing which voicemail messages to reviews and respond to, based on the displayed emotion information.

Figure 4:
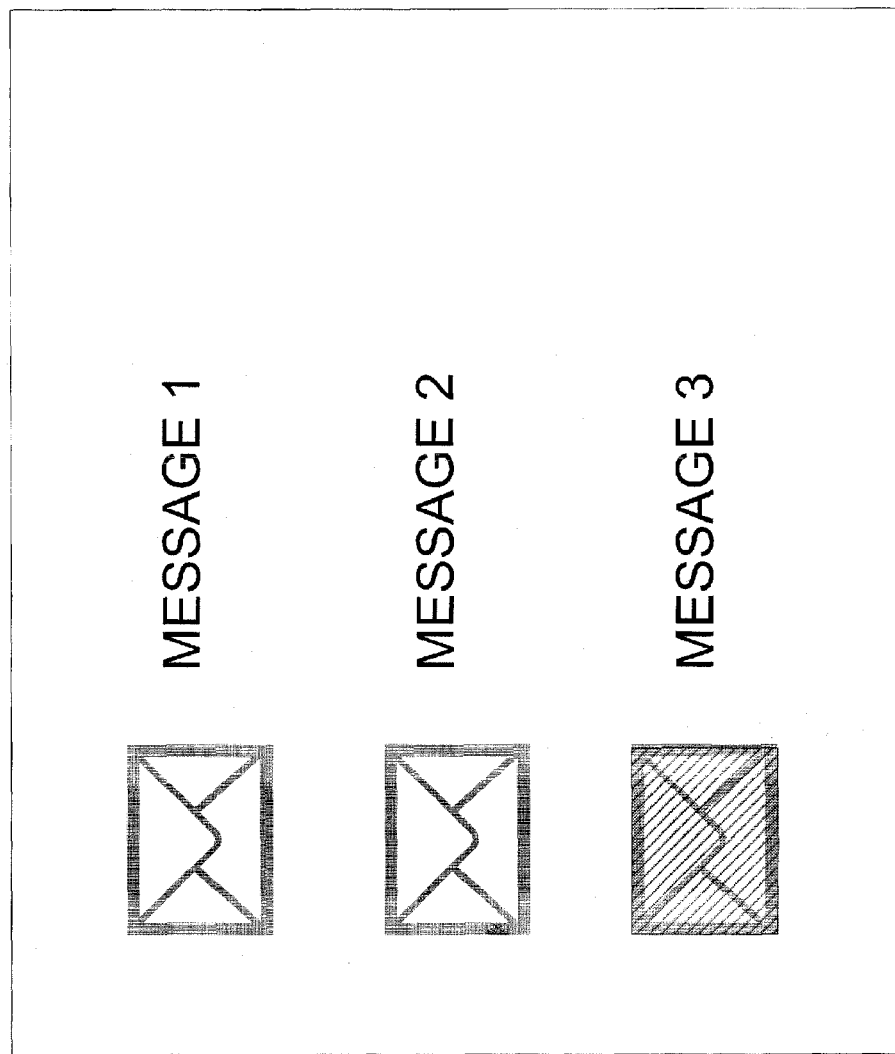
FIG. 4 is an illustrative portion of a user interface providing an alternate type of visual indication of emotion information determined for voicemail messages in accordance with some embodiments of the invention.

FIG. 4 shows another technique for providing a visual indication of an emotion expressed in a voicemail message. Some applications executing on a client device may associate a graphical symbol (e.g., an icon) with each received voicemail message. For example, as shown in FIG. 4, each message is associated with an envelope icon, which informs the user that a voicemail message has been received and transcribed and that the transcription is ready for viewing. Rather than associating an entirely different graphical symbol with voicemail messages, as just discussed with regard to FIG. 3, in the technique shown in FIG. 4, at least one characteristic of a common graphical symbol associated with each message (e.g., an envelope icon) is modified to identify the determined emotion(s) for the voicemail message. For example, the color, size, alignment, shading, or some other characteristic of the common graphical symbol may be modified to provide the indication of the at least one emotion determined to be expressed in the corresponding voicemail message. In the example of FIG. 4, the first and second messages are associated with a happy emotion and this may be represented using a green (unhatched) envelope, whereas the third message having an unhappy emotion expressed therein is associated with a red (hatched) envelope to convey the emotion information to the user. Any characteristic or combination of characteristics of a common graphical symbol may be modified to provide the indication of the emotion information to a user, as the techniques described herein are not limited by the particular manner in which a common graphical symbol is modified.

Figure 5:
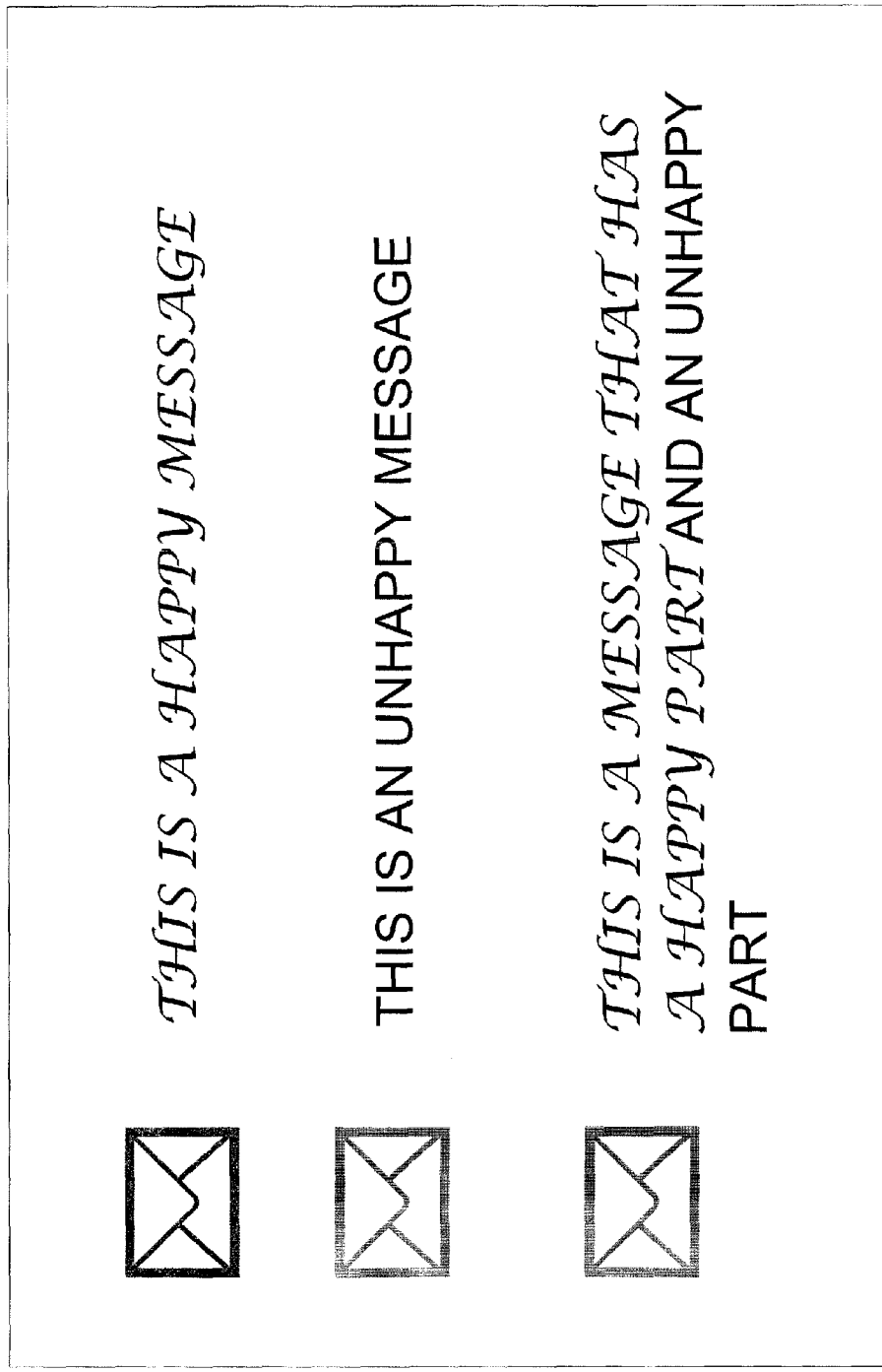
FIG. 5 is an illustrative portion of a user interface for providing another alternate type of visual indication of emotion information determined for voicemail messages in accordance with some embodiments of the invention.

FIG. 5 illustrates yet another technique for presenting a visual indication of emotion information determined for a voicemail message to a user of a client device. In the example of FIG. 5, one or more characteristics of the identifier of the voicemail message are selected based, at least in part, on the emotion information determined to be expressed in the voicemail message. The first message displayed in the example of FIG. 5 is associated with a happy emotion and based, at least in part, on this determination, the identifier for the first message (e.g., all or part of the voicemail transcription for the first message) may be displayed using a first type of font (e.g., script font). The second message displayed in FIG. 5 may be associated with an unhappy emotion and to convey this emotion information, the identifier of the second message (e.g., all or part of the voicemail transcription for the second message) may be displayed using a second different type of font (e.g., block font).

In the third message of FIG. 5, the emotion detection engine determined that different parts of the message were associated with different emotions. In the embodiments where all or part of the transcription of the message is displayed, these different emotions may be expressed using different display characteristics for parts of the transcription corresponding to the different emotions. In the example shown in FIG. 5, the first part of the voicemail message is associated with a happy emotion, and thus the part of the transcription corresponding to the first part of the message may be displayed using a first type of font (e.g., script font), while a second part of the voicemail message determined to be associated with an unhappy emotion may result in the corresponding part of the transcription being displayed using a second type of font (e.g., block font) that is different than the first type of font.

Although the example of FIG. 5 uses different font types to display the emotion information, it should be appreciated that other visual characteristics may also or alternatively be used to represent emotion information, as the techniques described herein are not limited by the particular way in which various display characteristics are used to identify the emotion information for voicemail messages. For example, rather than (or in addition to) using different font types, emotion may be represented by using different colors of text, font sizes, upper/lowercase letters, underlining, italics, boldface, highlighting, or any other suitable characteristics to represent emotion information in accordance with the techniques described herein. In the example of FIG. 5, an explicit identification of emotion (happy/unhappy) that is not present in the message itself is shown. However, it should be appreciated that any identifier of the voicemail message including all or part of the transcription of the message, or any other suitable identifier, may alternatively be displayed, as the techniques described herein are not limited in this respect.

In some embodiments, emotion information determined for at least a portion of a voicemail message in accordance with the techniques described herein, may be stored, and the stored emotion information may be used in any suitable way. For example, emotion information associated with voicemails for a particular speaker or group of speakers may be tracked over time to identify one or more behavioral patterns. In some embodiments, emotion information tracked over time may represented using one or more charts, graphs, tables, or other illustration to identify the behavioral pattern(s). The stored emotion information may be used in any suitable way including, but not limited to, presenting the information to one or more users, and informing one or more aspects of the emotion detection techniques described herein.

In some embodiments, the stored emotion information may be used to inform emotion detection by creating and/or modifying one or more language models used for emotion detection. For example, transcription segments for a voicemail associated with an emotion may be used to create an emotion-specific language model representative of that particular emotion. Following from the examples described above, in which the emotions happy and unhappy were used, an unhappy language model may be created based, at least in part, on transcription segments associated with an unhappy emotion, and a happy language model may be created based, at least in part, on transcription segments associated with a happy emotion. In some embodiments, as additional voicemails are received and segments of the voicemails are classified, the emotion-specific language models may be updated based on the additional classified transcription segments. The emotion-specific language models may be used in any suitable way including, but not limited to, facilitating an emotion classification decision of an unclassified textual representation of at least a portion of a voicemail, in accordance with the techniques described herein. For example, the emotion-specific language models may be used, at least in part, to determine an emotion for a transcription segment of a voicemail using one or more statistical techniques (e.g., maximum likelihood). Any suitable statistical techniques may be used to facilitate an emotion-classification decision, as the techniques described herein are not limited in this respect.

Figure 6:
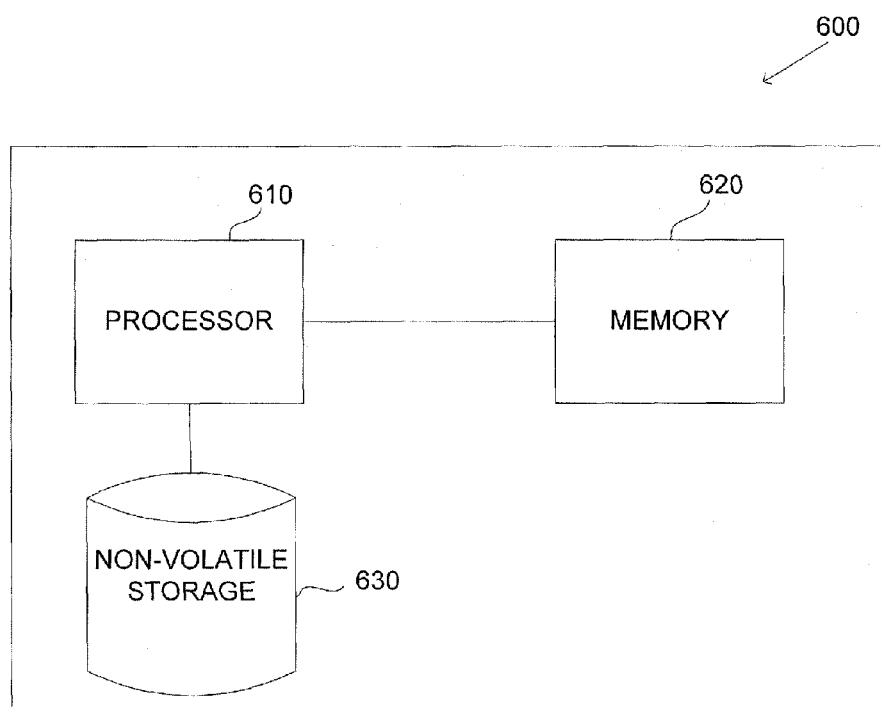
FIG. 6 is an exemplary computer system on which some embodiments of the invention may be implemented.

An illustrative implementation of a computer system 600 that may be used in connection with any of the embodiments of the invention described herein is shown in FIG. 6. The computer system 600 may include one or more processors 610 and one or more computer-readable tangible non-transitory storage media (e.g., memory 620, one or more non-volatile storage media 630, or any other suitable storage device). The processor 610 may control writing data to and reading data from the memory 620 and the non-volatile storage device 630 in any suitable manner, as the aspects of the present invention described herein are not limited in this respect. To perform any of the functionality described herein, the processor 610 may execute one or more instructions stored in one or more computer-readable storage media (e.g., the memory 620), which may serve as tangible non-transitory computer-readable storage media storing instructions for execution by the processor 610.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a USB drive, a flash memory, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use with a voicemail transcription system that processes a voicemail message and generates a textual representation of at least a portion of the voicemail message, the method comprising:
    determining based, at least in part, on the textual representation of the at least a portion of the voicemail message, at least one emotion expressed in the voicemail message, wherein the determining comprises applying at least one emotion classifier to the textual representation of the at least a portion of the voicemail message;
    storing preference information for a user of a client device configured to receive voicemail transcriptions, wherein the preference information describes preferences for how the user of the client device wants emotion information associated with the received voicemail transcriptions to be conveyed to the user on the client device; and
    providing on the client device, in accordance with the stored preference information, an indication of the determined at least one emotion prior to displaying the textual representation of the at least a portion of the voicemail message on the client device, wherein providing an indication of the determined at least one emotion comprises displaying on the client device at least one graphical symbol representing the determined at least one emotion with a truncated version of the textual representation.

2. The method of claim 1, wherein the determining the at least one emotion further comprises determining the at least one emotion based, at least in part, on an analysis of audio of the voicemail message.

3. The method of claim 1, wherein the providing the indication of the determined at least one emotion comprises:
    selecting at least one audio output based, at least in part, on the determined at least one emotion; and
    associating the at least one audio output with the textual representation of the at least a portion of the voicemail message.

4. The method of claim 1, wherein the at least one graphical symbol comprises an icon separated from but associated with the truncated version of the textual representation.

5. The method of claim 4, wherein providing the indication of the determined at least one emotion comprises displaying the icon in a particular color, wherein the particular color is determined based, at least in part, on the determined at least one emotion.

6. The method of claim 1, wherein providing the indication of the determined at least one emotion comprises outputting a particular ringtone from client device, selecting a particular agent persona to communicate with the user of the client device, or providing a particular vibration output from the client device.

7. A non-transitory computer-readable storage medium encoded with a plurality of instructions that, when executed by at least one processor, perform a method for use with a voicemail transcription system that processes a voicemail message and generates a textual representation of at least a portion of the voicemail message, the method comprising:
    determining based, at least in part, on the textual representation of the at least a portion of the voicemail message, at least one emotion expressed in the voicemail message, wherein the determining comprises applying at least one emotion classifier to the textual representation of the at least a portion of the voicemail message;
    storing preference information for a user of a client device configured to receive voicemail transcriptions, wherein the preference information describes preferences for how the user of the client device wants emotion information associated with the received voicemail transcriptions to be conveyed to the user on the client device; and providing on the client device, in accordance with the stored preference information, an indication of the determined at least one emotion prior to displaying the textual representation of the at least a portion of the voicemail message on the client device, wherein providing an indication of the determined at least one emotion comprises displaying on the client device at least one graphical symbol representing the determined at least one emotion with a truncated version of the textual representation.

8. The non-transitory computer-readable storage medium of claim 7, wherein the determining the at least one emotion further comprises determining the at least one emotion based, at least in part, on an analysis of audio of the voicemail message.

9. The non-transitory computer-readable storage medium of claim 7, wherein determining based, at least in part, on the textual representation of the at least a portion of the voicemail message, at least one emotion expressed in the voicemail message comprises comparing at least one word in the textual representation to a collection of stored words and/or n-grams associated with one or more emotions.

10. The non-transitory computer-readable storage medium of claim 7, wherein the at least one emotion classifier is selected from a group consisting of: support vector machines (SVMs), a logistic regression classifier, a Naïve Bayesian classifier, a Gaussian mixture model (GMM), and a statistical language model.

11. The non-transitory computer-readable storage medium of claim 7, wherein the providing the indication of the determined at least one emotion comprises:
   selecting at least one audio output based, at least in part, on the determined at least one emotion; and
   associating the at least one audio output with the textual representation of the at least a portion of the voicemail message.

12. The non-transitory computer-readable storage medium of claim 7, wherein the at least one graphical symbol comprises an icon separated from but associated with the truncated version of the textual representation.

13. The non-transitory computer-readable storage medium of claim 12, wherein providing the indication of the determined at least one emotion comprises displaying the icon in a particular color, wherein the particular color is determined based, at least in part, on the determined at least one emotion.

14. A computer system for use with a voicemail transcription system that processes a voicemail message and generates a textual representation of at least a portion of the voicemail message, the computer system comprising:

at least one storage device configured to store:
   at least one emotion classifier for determining at least one emotion expressed in the voicemail message; and
   preference information for a user of a client device configured to receive voicemail transcriptions from the voicemail transcription system, wherein the preference information describes preferences for how the user of the client device wants emotion information associated with the received voicemail transcriptions to be conveyed to the user on the client device; and
at least one processor programmed to:
   determine the at least one emotion, wherein the determining comprises applying the at least one emotion classifier to the textual representation of at least a portion of the voicemail message; and
   provide on the client device, in accordance with the stored preference information, an indication of the determined at least one emotion prior to displaying the textual representation of the at least a portion of the voicemail message on the client device, wherein providing an indication of the determined at least one emotion comprises displaying on the client device at least one graphical symbol representing the determined at least one emotion with a truncated version of the textual representation.

15. The computer system of claim 14, wherein the determining the at least one emotion further comprises determining the at least one emotion based, at least in part, on an analysis of audio of the voicemail message.

16. The computer system of claim 14, wherein the providing the indication of the determined at least one emotion comprises:
   selecting at least one audio output based, at least in part, on the determined at least one emotion; and
   associating the at least one audio output with the textual representation of the at least a portion of the voicemail message.

17. The computer system of claim 14, wherein the at least one graphical symbol comprises an icon having a particular color determined based, at least in part, on the determined at least one emotion.

18. The computer system of claim 14, wherein the at least one graphical symbol comprises an icon separated from but associated with the truncated version of the textual representation.

19. The computer system of claim 18, wherein providing the indication of the determined at least one emotion comprises displaying the icon in a particular color, wherein the particular color is determined based, at least in part, on the determined at least one emotion.

* * * * *